United States Patent
Iijima (10) Patent No.: US 9,791,103 B2
(45) Date of Patent: Oct. 17, 2017

(54) SERVO CONTROLLER FOR MEASURING LUBRICATION CHARACTERISTICS OF A MACHINE BY EXPERIMENTAL MODAL ANALYSIS

(71) Applicant: FANUC Corporation, Yamanashi (JP)

(72) Inventor: Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 84 days.

(21) Appl. No.: 15/010,671

(22) Filed: Jan. 29, 2016

(65) Prior Publication Data

US 2016/0223138 A1    Aug. 4, 2016

(30) Foreign Application Priority Data

Jan. 30, 2015   (JP) .................................. 2015-017967

(51) Int. Cl.
*G05D 19/00*       (2006.01)
*G05B 11/32*       (2006.01)
(Continued)

(52) U.S. Cl.
CPC .......... *F16N 29/04* (2013.01); *G05B 23/0256* (2013.01); *H02P 2205/07* (2013.01)

(58) Field of Classification Search
CPC ...... G05D 19/00; G05B 19/406; G05B 11/32; G05B 23/0256; H02P 23/14
(Continued)

(56) References Cited

U.S. PATENT DOCUMENTS

| 6,281,650 B1 * | 8/2001 | Yutkowitz ............ | G05B 13/042 |
| | | | 318/561 |
| 9,429,936 B2 * | 8/2016 | Iijima .................... | G05B 11/011 |
| 9,465,381 B2 * | 10/2016 | Iijima .................... | G05B 19/19 |

FOREIGN PATENT DOCUMENTS

| JP | 3-174911 A | 7/1991 |
| JP | 3-282717 A | 12/1991 |
| JP | 2002-116802 A | 4/2002 |

OTHER PUBLICATIONS

Shinagawa, M. et al., "Prediction of Chatter Stability of Machine Tool with Consideration of Friction Damping in Guide (Development of Basic Model and Investigation on Effects of Friction and Stiffness)", Transactions of the Japan Society of Mechanical Engineers series C, Mar. 25, 2012, vol. 78, No. 787, pp. 1013-1025.

(Continued)

*Primary Examiner* — Bentsu Ro
(74) *Attorney, Agent, or Firm* — Hauptman Ham, LLP (57) ABSTRACT

A servo controller includes: a sinusoidal wave disturbance input unit for supplying a sinusoidal wave disturbance to a speed control loop including a speed command generator, a torque command generator and a speed detector; a frequency response calculator for estimating the gain and phase from the output of the speed control loop; a resonance frequency detector for detecting resonance frequencies at which the gain becomes maximum; a resonance mode characteristics analyzer for estimating resonance characteristics from the frequency response; and, a reference modal damping ratio retainer for retaining a reference modal damping ratio as a resonance characteristic corresponding to the reference lubricating condition, and the resonance mode characteristics analyzer calculates lubrication characteristics on the basis of the reference modal damping ratio and the measured modal damping ratio at the resonance frequency corresponding to the reference modal damping ratio.

3 Claims, 7 Drawing Sheets

(51) Int. Cl.
    *H02P 21/00* (2016.01)
    *F16N 29/04* (2006.01)
    *G05B 23/02* (2006.01)

(58) Field of Classification Search
    USPC ...... 318/563–565, 568.17, 568.18, 575, 590,
    318/596, 606–608, 610
    See application file for complete search history.

(56) References Cited

OTHER PUBLICATIONS

Sakai, Y. et al., "Influence of the Excitation Force Amplitude on Vibration Characteristics of a Linear Rolling bearing", Journal of the Japan Society for Precision Engineering, Aug. 5, 2014, vol. 80, No. 8, p. 783-791.

Sakai, Y. et al., "Influence of Excitation Force on Damping of Rolling Guideway in Feed and Pitch Direction", JIMTOF 2014 poster publication, Department of Mechanical and Control Engineering, Tokyo Institute of Technology, Oct. 30, 2014, 2 pages.

* cited by examiner

PRIOR ART

FIG. 3B

PRIOR ART

FIG. 4A

PRIOR ART

FIG. 4B

PRIOR ART

FIG. 5A

TRANSLATIONAL VIBRATION IN FEED DIRECTION

NO RESONANCE PEAK FORMED

PRIOR ART

FIG. 5B

ROTATIONAL VIBRATION IN PITCH DIRECTION

LOWERED TO ABOUT ONE QUARTER OF THE MAXIMUM

THIS CHARACTERISTIC IS AFFECTED BY LUBRICATION

PRIOR ART

SERVO CONTROLLER FOR MEASURING LUBRICATION CHARACTERISTICS OF A MACHINE BY EXPERIMENTAL MODAL ANALYSIS

RELATED APPLICATIONS

The present application claims priority to Japanese Application Number 2015-017967, filed Jan. 30, 2015, the disclosure of which is hereby incorporated by reference herein in its entirety.

BACKGROUND OF THE INVENTION

1. Field of the Invention

The present invention relates to a servo control apparatus, and in particular to a servo control apparatus equipped with a function of measuring mechanical lubrication characteristics on the basis of experimental modal analysis.

2. Description of the Related Art

Friction characteristics and vibration characteristics of a guiding mechanism in a machine tool will affect the operation performance of the feed axis and generation of chattering vibration at a machining stage. In such problems, the friction damping performance of the machine, in other words, the lubrication characteristics, have been commonly understood to be essentially important.

For example, it has been both experimentally and analytically clarified that improvement in stability against chattering vibration cannot be achieved by enhancing the stiffness of the machinery, but need to optimize both the stiffness of individual parts of the machinery and the damping characteristics (for example, Transactions of the Japan Society of Mechanical Engineers series C, Vol. 78, No. 787 (2012), pp. 1013-1025, which will be referred to hereinbelow as "non-patent document 1").

It has also been reported that in an excitation test of a machine there exists excitation force-dependency and that the resonance frequency and damping ratio greatly vary depending on the magnitude of excitation force (for example, Yasunori Sakai et al., Journal of the Japan Society for Precision Engineering, Vol. 80, No. 8 (2014), p. 783-791, which will be referred to hereinbelow as "non-patent document 2"). The document suggests that the main reason for this is attributed to non-linear spring characteristics of the friction in a micro displacement area of some tens micrometers. There has been a recent report on a study in which the relationship between mechanical damping and non-linear friction was quantitatively evaluated by experiment (for example, Yasunori Sakai et al., JIMTOF 2014 poster publication "Influence of Excitation Force on Damping of Rolling Guideway in Feed and Pitch Direction", which will be referred to hereinbelow as "non-patent document 3"). This publication demonstrates that the modal damping ratio (the half-value width of the resonance curve) becomes greater as the excitation force becomes greater, as a result of performing an excitation test on a machine to examine resonance characteristics of the compliance function (excitation force and displacement frequency response) by experimental modal analysis.

SUMMARY OF THE INVENTION

It is therefore an object of the present invention to provide a servo controller that can detect the lubricating condition of a machine and can mainly maintain the machine on the basis of the grasp of the lubricating condition.

A servo controller according to one aspect of the present invention is a controller for a servo motor that drives a feed axis provided for a machine tool, comprising: a speed command generator for generating a speed command value for the servo motor; a torque command generator for generating a torque command value for the servo motor on the basis of the speed command value; a speed detector for detecting the speed of the servo motor driven on the basis of the torque command value; a sinusoidal wave disturbance input unit for supplying a sinusoidal wave disturbance to a speed control loop including the speed command generator, the torque command generator and the speed detector; a frequency response calculator for estimating the gain and phase of the speed control loop input/output signal on the basis of the output of the speed control loop when the sinusoidal wave disturbance is input to the speed control loop; a resonance frequency detector for detecting resonance frequencies at which the gain of the frequency response estimated by the frequency response calculator becomes maximum; a resonance mode characteristics analyzer for estimating resonance characteristics from the frequency response at and around the response frequency detected by the resonance frequency detector; and, a reference modal damping ratio retainer for retaining the reference modal damping ratio as a resonance characteristic corresponding to the reference lubricating condition, wherein the resonance mode characteristics analyzer calculates lubrication characteristics on the basis of the reference modal damping ratio and the measured modal damping ratio at the resonance frequency corresponding to the reference modal damping ratio.

BRIEF DESCRIPTION OF THE DRAWINGS

The object, features and advantages of the present invention will be better understood by reading the following description of the embodiments, taken together with the drawings wherein.

DESCRIPTION OF THE INVENTION

Servo control apparatuses according to the present invention will be described.

First Embodiment

Figure 1:
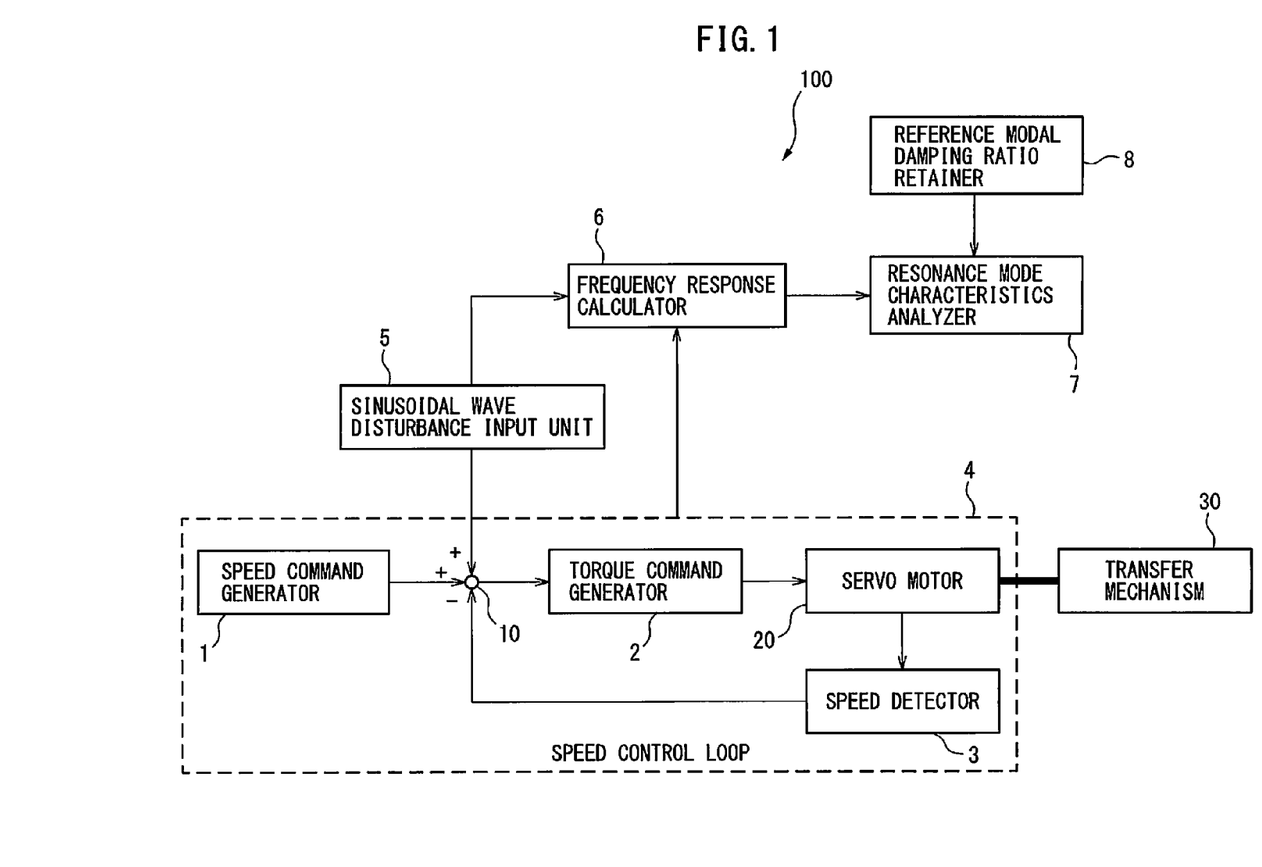
FIG. 1 is a block diagram showing a servo controller according to the first embodiment of the present invention.

To begin with, a servo controller according to the first embodiment of the present invention will be described. FIG. 1 shows a block diagram of the servo controller according to the first embodiment of the present invention. The servo controller 100 according to the first embodiment of the present invention is to be used to control a servo motor for driving a feed axis provided for a machine tool, and includes: a speed command generator 1 for generating a speed command value for a servo motor 20; a torque command generator 2 for generating a torque command value for the servo motor on the basis of the speed command value; a speed detector 3 for detecting the speed of the servo motor driven on the basis of the torque command value; a sinusoidal wave disturbance input unit 5 for supplying a sinusoidal wave disturbance to a speed control loop 4 including the speed command generator 1, the torque command generator 2 and the speed detector 3; a frequency response calculator 6 for estimating the gain and phase of the speed control loop input/output signal on the basis of the output of the speed control loop 4 when the sinusoidal wave disturbance is input to the speed control loop 4; a resonance frequency detector (not shown) for detecting resonance frequencies at which the gain of the frequency response estimated by the frequency response calculator 6 becomes maximum; a resonance mode characteristics analyzer 7 for estimating resonance characteristics from the frequency response at and around the resonance frequency detected by the resonance frequency detector; a reference modal damping ratio retainer 8 for retaining the reference modal damping ratio as a resonance characteristic corresponding to the reference lubricating condition, and is characterized in that the resonance mode characteristics analyzer 7 calculates lubrication characteristics on the basis of the reference modal damping ratio and the measured modal damping ratio at the resonance frequency corresponding to the reference modal damping ratio.

Next, the operation of the servo controller according to the first embodiment of the present invention will be described. First, the speed command generator 1 generates a speed command value for driving the servo motor 20 and outputs the value to the adder 10. The adder 10 adds the sinusoidal wave disturbance input from the sinusoidal wave disturbance input unit 5 to the speed command value, subtracts the detected speed value of the servo motor 20 detected by the speed detector 3 and outputs the calculated result to the torque command generator 2.

The torque command generator 2 acquires the calculated result from the adder 10 and outputs a torque command to drive the servo motor 20. The servo motor 20 operates a driven body (not shown) via the transfer mechanism 30.

The frequency response calculator 6 estimates the gain and phase of the speed control loop input/output signal on the basis of the sinusoidal wave disturbance from the sinusoidal wave disturbance input unit 5 and the output of the speed control loop 4 when the sinusoidal wave disturbance is input to the speed control loop 4 and output the estimated result to the resonance mode characteristics analyzer 7. The resonance mode characteristics analyzer 7 includes a resonance frequency detector (not shown) for detecting resonance frequencies at which the gain of the frequency response estimated by the frequency response calculator 6 becomes maximum.

The resonance mode characteristics analyzer 7 estimates resonance characteristics on the basis of the frequency response at and around the frequency detected by the resonance frequency detector. The reference modal damping ratio retainer 8 retains the reference modal damping ratio as a resonance characteristic corresponding to the reference lubricating condition. For example, the retainer 8 may retain a resonance modal damping ratio at a particular frequency at the time of manufacturing as the reference modal damping ratio. The resonance mode characteristics analyzer 7 acquires the reference modal damping ratio from the reference modal damping ratio retainer 8 and calculates lubrication characteristics on the basis of the reference modal damping ratio and the measured modal damping ratio at the resonance frequency corresponding to the reference modal damping ratio.

The present invention is to measure the lubrication characteristics using an easily executable excitation test, i.e., using frequency response of motor control. The frequency response of the control system can be analyzed on the basis of modal analysis. The mechanical lubrication characteristics can be measured by obtaining the damping ratio of the resonance mode from the actual measurement and determining the relative ratio to the reference damping ratio. Usually, when performing a compliance measurement it is necessary to apply impacts to a machine by a stationary exciter or a hammer and measure the fine displacement at that moment. However, when the machine has been assembled and finished with sheet metal frames and the like, it is difficult to directly measure the compliance of the feed axis drive system. In contrast to this, use of the frequency response in the motor control as in the servo controller according to the first embodiment of the present invention, makes it possible to measure the lubricant characteristics of a machine if the machine is in the final stage of production or even in operation.

A technique referred to as experimental modal analysis is used in order to analyze mechanical vibration (in contrast to this, theoretical modal analysis refers to the so-referred to as finite element method). Experimental modal analysis is an analyzing technique that actually measures frequency response and estimates characteristic values from the result of measurement. When there are a large number of independent spring-mass-damper systems, so many sets of independent equations of motion can be obtained.

Figure 2:
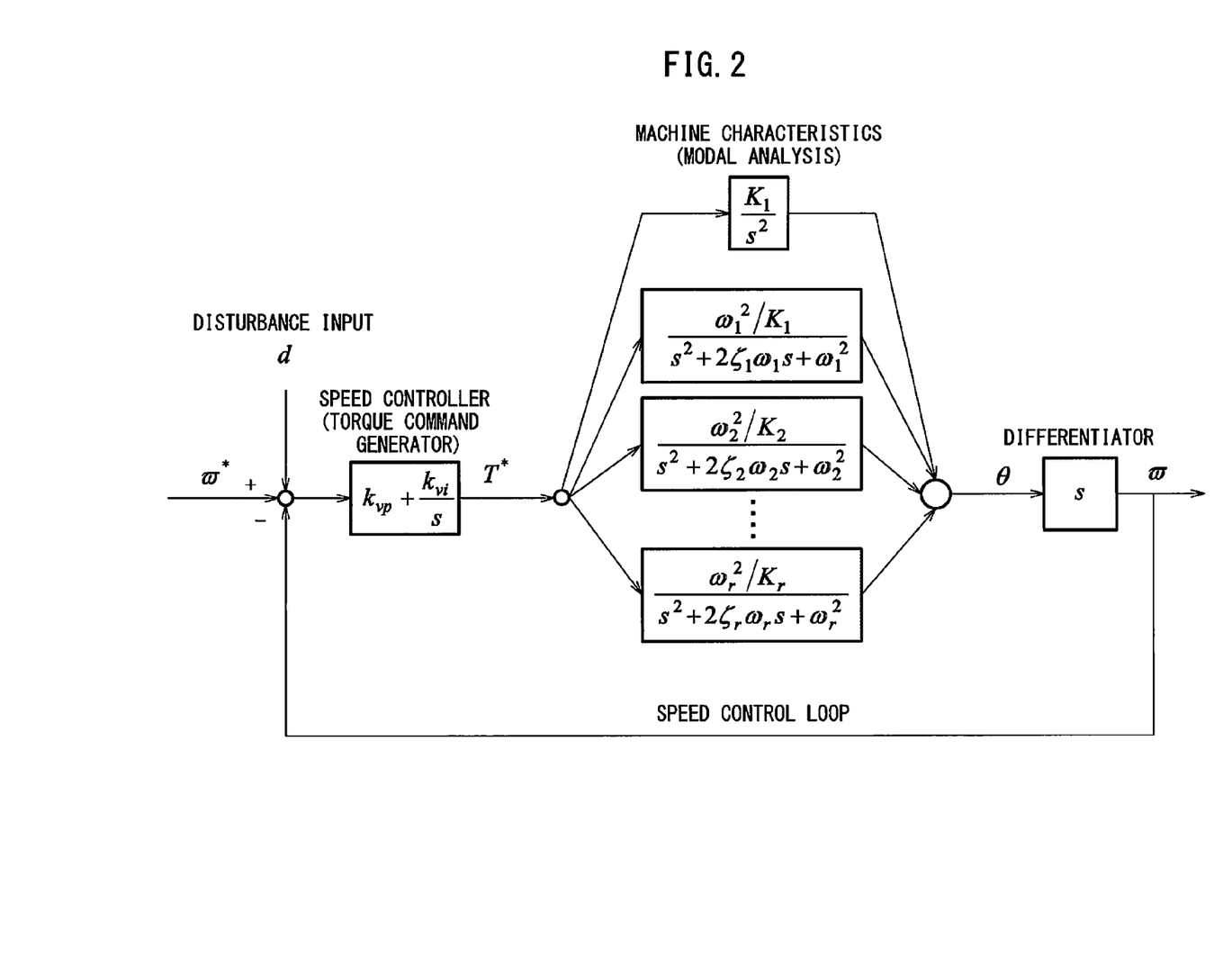
FIG. 2 is a block diagram representing a transfer function of a mechanical transfer mechanism by the sum of quadratic systems.

Applying the idea of this modal analysis, the transfer function of the mechanical transfer mechanism can be represented by the sum of second-order systems as shown in FIG. 2. Each of the second-order systems is referred to as a resonance mode while the term of an integrator is referred to as rigid body mode. In the experimental modal analysis, the parameters of the transfer function thus represented are determined from the actually measured frequency response. $\omega_r$ is referred to as a resonance angular frequency, $\zeta_r$ a modal damping ratio, and $\kappa_r$ a mode equivalent stiffness. In the present invention, measurement and analysis focusing on the modal damping ratio $\zeta_r$ is handled. The modal damping ratio $\zeta_r$ can be calculated from amplitude response as $\zeta_r = \Delta f/(2f_0)$ using the frequency $f_0$ at the peak, the frequency width $\Delta f$ at half maximum or at the level −3 dB lowered from the peak point.

Figure 3A:
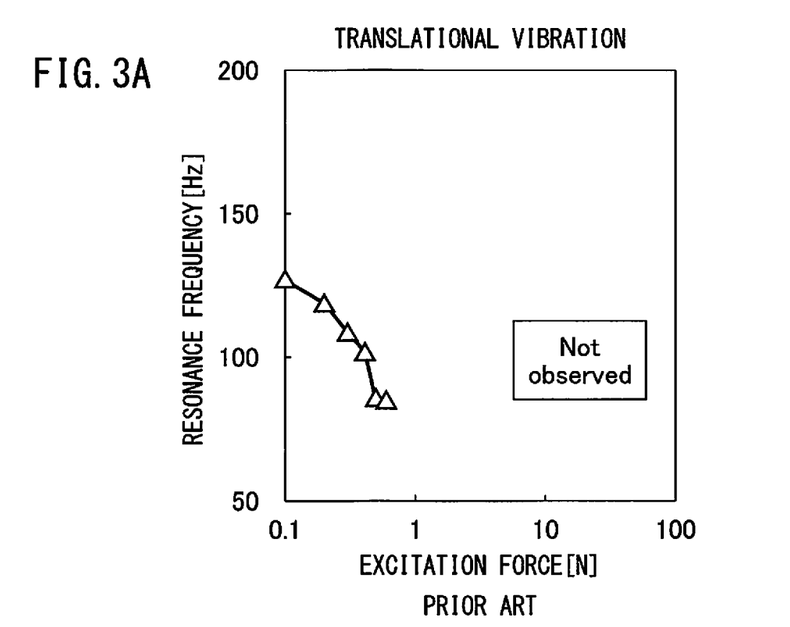
FIG. 3A is a graph representing dependence of the resonance frequency on excitation force in a case where a translational vibration is applied.
Figure 3B:
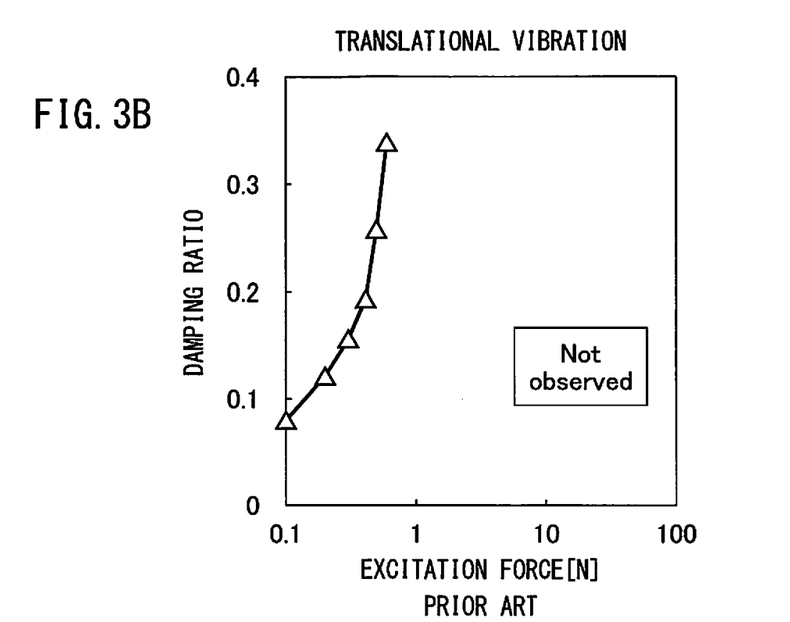
FIG. 3B is a graph representing dependence of the damping ratio on excitation force in a case where a translational vibration is applied.
Figure 4A:
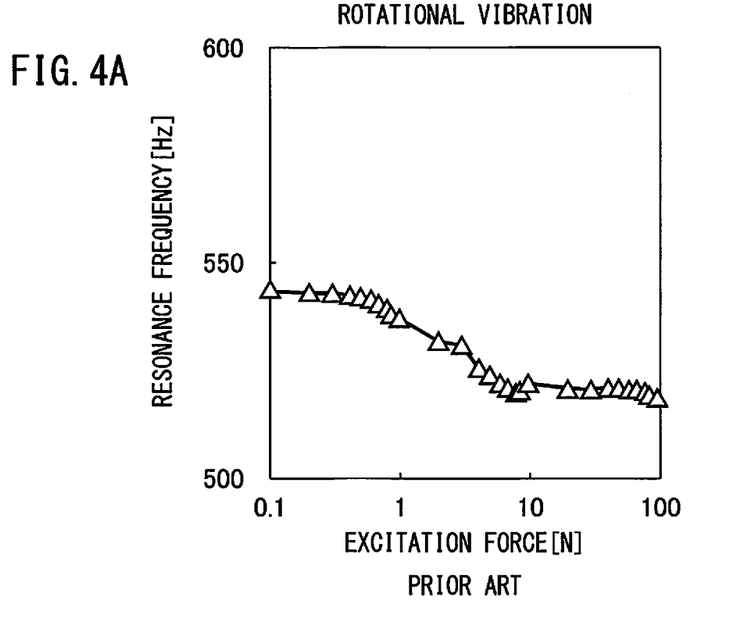
FIG. 4A is a graph representing dependence of the resonance frequency on excitation force in a case where a rotational vibration is applied.
Figure 4B:
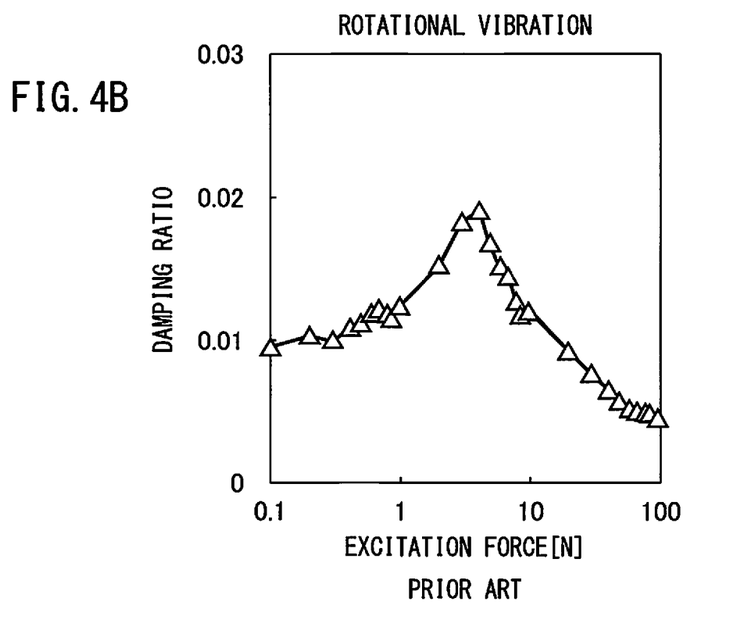
FIG. 4B is a graph representing dependence of the damping ratio on excitation force in a case where a rotational vibration is applied.
Figure 5A:
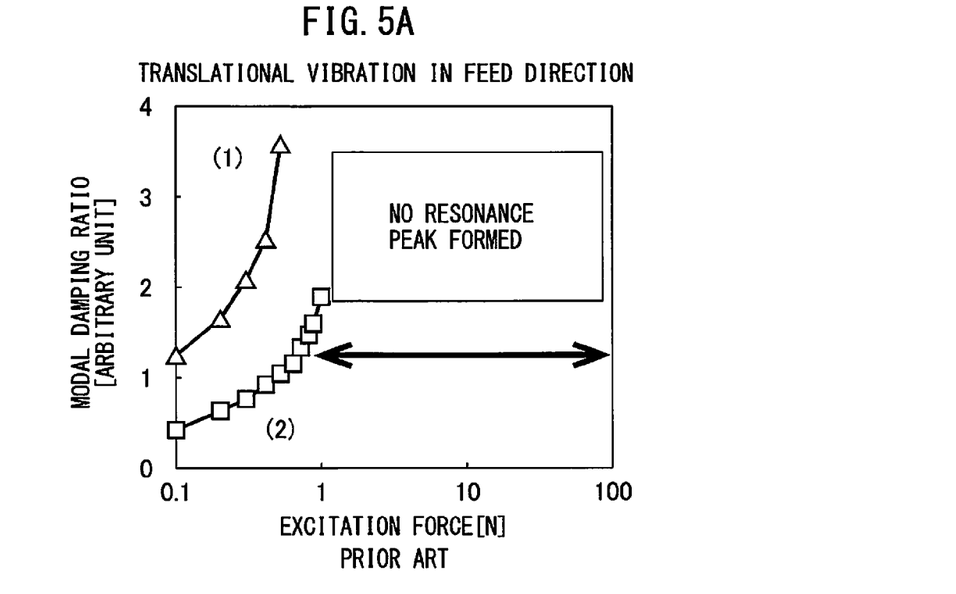
FIG. 5A is a graph representing dependence of the modal damping ratio on excitation force in a case where a translational vibration in the feed direction is applied.
Figure 5B:
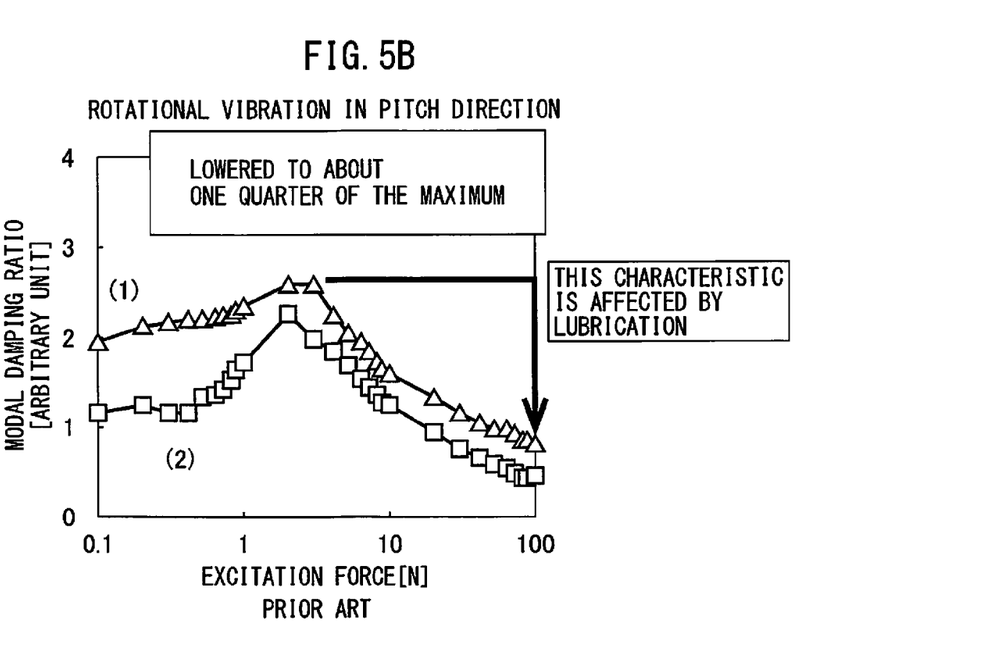
FIG. 5B is a graph representing dependence of the modal damping ratio on excitation force in a case where a rotational vibration in the pitch direction is applied.

The important point described in the non-patent documents 2 and 3 is that the resonance frequency and modal damping ratio obtained by experimental modal analysis is dependent on excitation force. FIG. 3A is a graph representing dependence of the resonance frequency on excitation force in a case where a translational vibration is applied as in the description of the non-patent document 2. FIG. 3B is a graph representing dependence of the damping ratio on excitation force in a case where a translational vibration is applied as in the description of the non-patent document 2. FIG. 4A is a graph representing dependence of the resonance frequency on excitation force in a case where a rotational vibration is applied as in the description of the non-patent document 2. FIG. 4B is a graph representing dependence of the damping ratio on excitation force in a case where a rotational vibration is applied as in the description of the non-patent document 2. FIG. 5A is a graph representing dependence of the modal damping ratio on excitation force in a case where a translational vibration in the feed direction is applied as in the description of the non-patent document 3. FIG. 5B is a graph representing dependence of the modal damping ratio on excitation force in a case where a rotational vibration in the pitch direction is applied as in the description of the non-patent document 3. The two curves in each of FIGS. 5A and 5B represent a case (1) where grease is applied and a case (2) where grease is not applied. In FIGS. 3A, 3B, 4A, 4B, 5A and 5B show actual measurements of the dependence of the friction of the roller guide on excitation force. When two points, or the fact that the modal damping ratio shown herein is dependent on excitation force and the fact that the lubricating condition of the guide surface greatly affect the characteristics, are comprehensively considered, it is principally possible to determine the lubricating condition of the guide surface on the basis of the modal damping ratio.

In the servo controller according to the first embodiment of the present invention, the characteristic values of the resonance mode are identified on the basis of the frequency response at and around the resonance frequency and regarded as physical quantities representing the characteristics of the transfer mechanism. Of the resonance characteristics, the modal damping ratio corresponds to the friction coefficient. Accordingly, the modal damping ratios of low-order resonance modes represent the lubrication characteristics of the guide surface of the machine. Therefore, according to the servo control apparatus of the first embodiment of the present invention, it is possible to provide a servo control apparatus capable of grasping the lubricating condition of the machine.

Second Embodiment

Next, a servo controller according to the second embodiment of the present invention will be described. The servo controller of the second embodiment of the present invention is characterized in that the resonance mode characteristics analyzer 7 evaluates the degree of relative lowering of the lubricating condition by determining the relative ratio between the reference modal damping ratio and the measured modal damping ratio. The other configurations are the same as those in the servo control apparatus according to the first embodiment, and therefore a detailed description is omitted.

For example, the resonance modal damping ratio at a particular frequency at the time of production is set as a reference. When the frequency response of speed control is periodically measured, the modal damping ratio decreases with time. In this case, measurement may be performed with the amplitude of excitation force made smaller. This is because if strong excitation force is applied, displacement of the machine is too large so that non-linear characteristics of the machine will not be observed, resulting in losing information on friction and lubrication from the measured values.

Not limited to one resonance mode, multiple resonance modes can be selected. That is, multiple resonance modes can be measured and monitored as long as they are resonance modes that clearly show the lubricating condition on the guide surface. From a physical point of view, because resonance modes of low frequencies are predominant in dynamic characteristics of a machine, handling of the primary (the lowest resonance frequency) and secondary modes is usually enough. The reason is that the modal analysis is originally a methodology that describes vibrations of a continuous body as the sum of damping vibrations of multiple independent one degree-of-freedom systems, and that one degree-of-freedom systems of low order modes produce predominant vibrations. Since each of the mode resonance ratios represents the viscos friction coefficient of the corresponding one degree-of-freedom system, lowering of the modal damping ratio directly indicates lowering of the friction coefficient. Therefore, lowering of the friction coefficients of low-order modes simply implies lowering of predominant frictional components on the guide surface.

This result can be used for preventive maintenance technology. As a premise, lubrication may become worse due to abrasive degradation of the lubricant with passage of time but will never improve. For example, a controller stores "reference modal damping ratio" which is the modal damping ratio on the basis of the lubrication performance at the time of production. Frequency response is periodically measured so as to calculate the modal damping ratio (measured modal damping ratio) by modal analysis.

Figure 6:
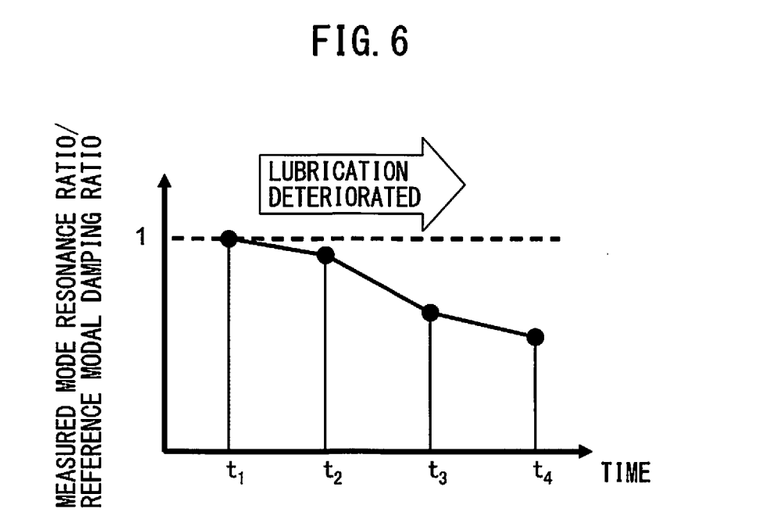
FIG. 6 is a graph representing time-dependence of measured mode resonance ratio/reference modal damping ratio.

FIG. 6 is a graph representing time-dependence of the value obtained by dividing the measured mode resonance ratio by the reference modal damping ratio (measured mode resonance ratio/reference modal damping ratio). When it is assumed that the measured mode resonance ratio is equal to the reference modal damping ratio at time $t_1$, the value of measurement mode resonance ratio/reference mode resonance ratio monotonously decreases with the passage of time $t_2$, $t_3$, and $t_4$. As shown in FIG. 6, since the calculated measured modal damping ratio is smaller than the reference modal damping ratio, this ratio can be regarded as the measurement result of the lubricating condition. That is, it is possible to evaluate that "the lubricating condition is 80% of that at the time of production of the machine."

As described above, according to the servo control apparatus of the second embodiment of the present invention, since the relative ratio of the modal damping ratio obtained from frequency response measured at a certain point of time to the reference modal damping ratio is evaluated, it is possible to provide a servo controller that can perform maintenance on the basis of the machine's lubricant condition.

Third Embodiment

Next, a servo controller according to the third embodiment of the present invention will be described. The servo control apparatus according to the third embodiment of the present invention is characterized in that when the measured modal damping ratio relative to the reference modal damping ratio is lower than a threshold, the resonance mode characteristics analyzer 7 warns of degradation in lubricating condition in order to demonstrate the necessity of inspection of the lubricating condition. The other configurations are the same as those in the servo control apparatus according to the first embodiment, so a detailed description is omitted.

Figure 7:
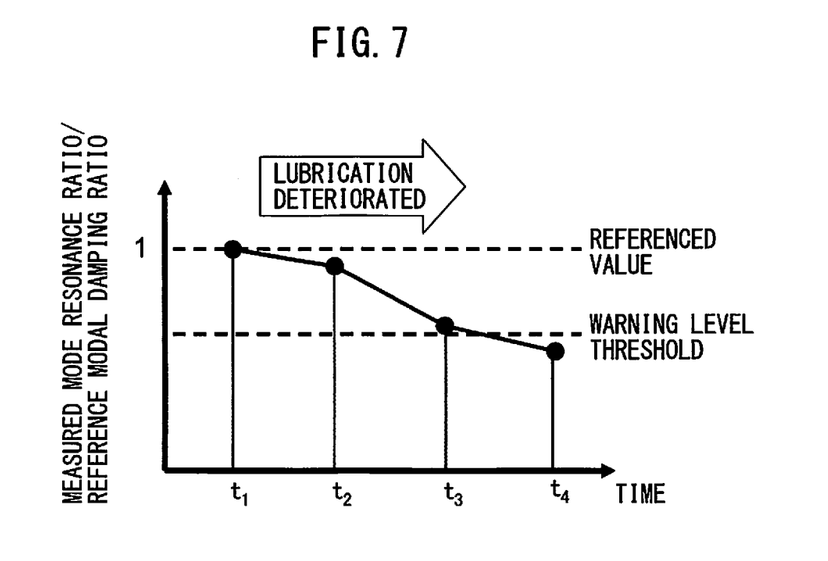
FIG. 7 is a graph showing the relationship between the time-dependence of measured mode resonance ratio/reference modal damping ratio and a warning level threshold; and, FIG. 8 is a flow chart for illustrating an operation sequence of a servo control apparatus according to an embodiment of the present invention.

FIG. 7 is a graph showing the relationship between the time-dependence of the measured mode resonance ratio/the reference modal damping ratio and a warning level threshold. When the modal damping ratio has excessively lowered and become 50% of the reference modal damping ratio, for example at time $t_4$ for a certain measurement, a warning is displayed. This function is effective in performing periodical inspection of the machine in operation. Since lubricating condition readily varies due to entry of foreign matter, the convenience of this method, that is, the capability of grasping the lubricating condition from frequency response of motor control, can produce the most efficient use. Here, setting the warning threshold level at 50% of the reference modal damping ratio is a mere example, hence the threshold may be set at another level.

Since internal damping of a machine greatly affects machining performance, deterioration of lubrication directly degrades machining performance. To deal with this, warning is displayed when degradation of lubrication becomes too large, so as to recommend application of lubricant. A display device may be provided to display warning. Warning sounds may be used for notification.

Figure 8:
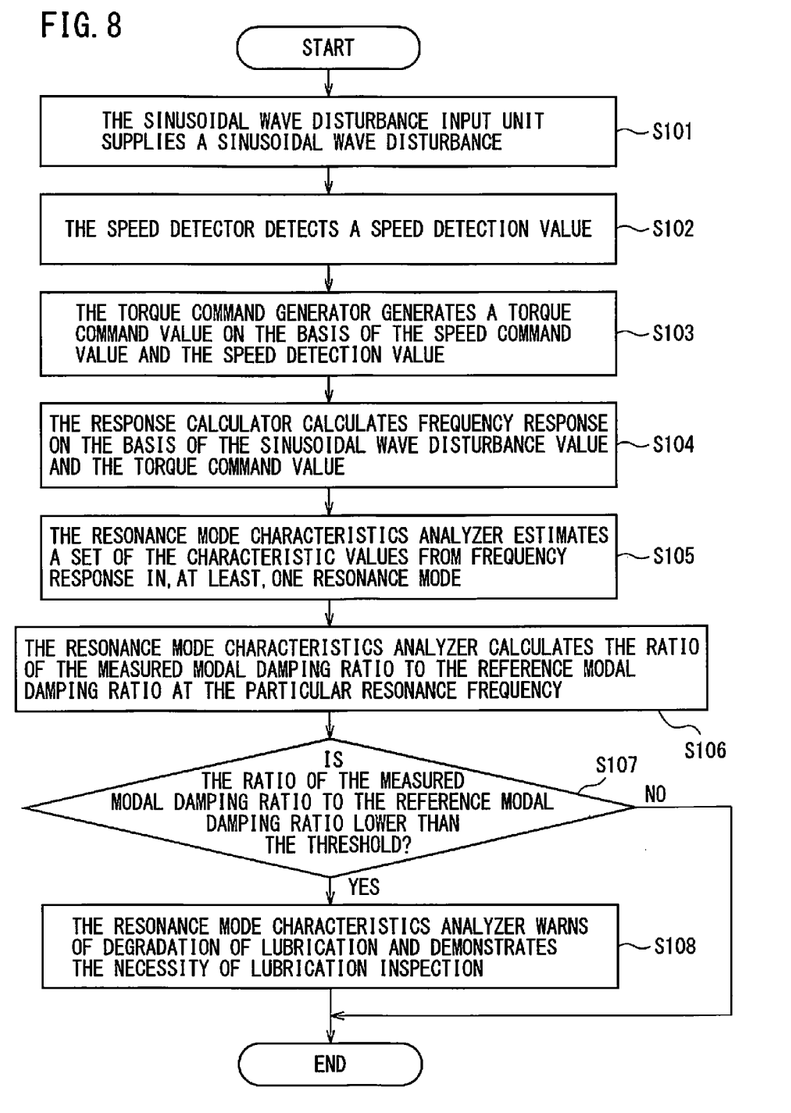

Next, the operation sequence of the servo controller according to the third embodiment of the present invention will be described with reference to a flow chart shown in FIG. 8. First, at Step S101 the sinusoidal wave disturbance unit 5 (see FIG. 1) supplies a sinusoidal wave disturbance to the speed control loop 4. Next, at Step S102 the speed detector 3 detects the speed of the servo motor 20.

Next, at Step S103 the torque command generator 2 generates a torque command value from the speed command value and the speed detection value. Then, at Step S104 the frequency response calculator 6 calculates frequency response from the sinusoidal wave disturbance value and the torque command value.

Next, at Step S105 the resonance mode characteristics analyzer 7 estimates a set of the characteristic values of, at least, one resonance mode. Then, at Step S106 the resonance mode characteristics analyzer 7 calculates the ratio of the measured modal damping ratio to the reference modal damping ratio at the particular resonance frequency.

Next, at Step S107 the resonance mode characteristics analyzer 7 determines whether or not the ratio of the measured modal damping ratio to the reference modal damping ratio is lower than the threshold. When the ratio of the measured modal damping ratio to the reference modal damping ratio is determined to be not lower than the threshold, a series of processing is ended.

On the other hand, when the ratio of the measured modal damping ratio to the reference modal damping ratio is determined to be lower than the threshold, at Step S108 the resonance mode characteristics analyzer 7 warns of degradation in lubrication and displays the necessity of lubrication inspection.

According to the servo controller according to the third embodiment of the present invention, displaying the necessity of lubrication inspection makes it possible to prevent the relative ratio from seriously lowering with passage of time, hence prevent degradation of machining performance due to marked lowering of the lubricating performance on the mechanical guide surface.

As described heretofore, according to the servo controller of the embodiment of the present invention, it is possible to provide a servo control apparatus that can grasp the lubricating condition of a machine and can mainly maintain the machine on the basis of the grasp of the lubricating condition.

The invention claimed is:

1. A servo controller for a servo motor that drives a feed axis provided for a machine tool, comprising:
   a speed command generator configured to generate a speed command value for a servo motor;
   a torque command generator configured to generate a torque command value for the servo motor on the basis of the speed command value;
   a speed detector configured to detect the speed of the servo motor driven on the basis of the torque command value;
   a sinusoidal wave disturbance input unit configured to supply a sinusoidal wave disturbance to a speed control loop including the speed command generator, the torque command generator and the speed detector;
   a frequency response calculator configured to estimate the gain and phase of the speed control loop input/output signal on the basis of the output of the speed control loop when the sinusoidal wave disturbance is input to the speed control loop;
   a resonance frequency detector configured to detect resonance frequencies at which the gain of the frequency response estimated by the frequency response calculator becomes maximum;
   a resonance mode characteristics analyzer configured to estimate resonance characteristics from the frequency response at and around the response frequency detected by the resonance frequency detector; and,
   a reference modal damping ratio retainer configured to retain the reference modal damping ratio as a resonance characteristic corresponding to the reference lubricating condition,
   wherein the resonance mode characteristics analyzer calculates lubrication characteristics on the basis of the reference modal damping ratio and the measured modal damping ratio at the resonance frequency corresponding to the reference modal damping ratio.

2. The servo control apparatus according to claim 1, wherein the resonance mode characteristics analyzer evaluates the degree of relative lowering of the lubricating condition by determining the relative ratio between the reference modal damping ratio and the measured modal damping ratio.

3. The servo control apparatus according to claim 1, wherein when the measured modal damping ratio relative to the reference modal damping ratio is lower than a threshold, the resonance mode characteristics analyzer warns of degradation in lubricating condition in order to demonstrate the necessity of inspection of the lubricating condition.

* * * * *